United States Patent

[11] 3,587,217

[72] Inventor Billie L. Harriott
    22 Madrid Plaza
    Mesa, Ariz.
[21] Appl. No. 872,552
[22] Filed Oct. 30, 1969
[45] Patented June 28, 1971

[54] COMBINATION VINE TRAINER AND HARVESTER
    3 Claims, 7 Drawing Figs.
[52] U.S. Cl. .................................................. 56/327,
                                                    56/376, 47/1
[51] Int. Cl. .................................................. A01d 45/00,
                                                    A01d 77/06
[50] Field of Search .................................................. 56/327,
                                                    376, 27; 47/1

[56] References Cited
    UNITED STATES PATENTS
    2,545,723  3/1951  Conner ........................ 56/376
    2,699,639  1/1955  Lambert et al. ............... 56/376
    3,277,605  10/1966 O'Brien ........................ 47/1

Primary Examiner—Russell R. Kinsey
Attorney—Drummond, Cahill and Phillips

ABSTRACT: An improved apparatus for training vines and selectively harvesting melons which, in addition to previously known means for employing flexible fingers for training vines, adds an improved suspension system featuring means for adjusting pitch, roll and yaw attitudes of the apparatus.

INVENTOR.
BILLIE L. HARRIOTT
BY
Drummond, Cahill & Phillips
ATTORNEYS

INVENTOR.
BILLIE L. HARRIOTT
BY
Drummond, Cahill & Phillips
ATTORNEYS

PATENTED JUN28 1971

INVENTOR.
BILLIE L. HARRIOTT
BY
Drummond, Cahill & Phillips
ATTORNEYS

COMBINATION VINE TRAINER AND HARVESTER

This apparatus relates to agricultural machinery; more specifically, this device relates to a machine for training vines and selectively harvesting melons and the like.

In yet another aspect, this apparatus pertains to improvements in machines of the type described wherein attitudes of pitch, roll and yaw, in respect to said machine, may be more conveniently controlled.

Currently, cantaloupe harvesting in the cantaloupe growing areas of the world is almost entirely a hand operation which requires large amounts of agricultural labor during a relatively brief season. It is estimated that the harvesting, grading and packaging expenditures for cantaloupe in the southwestern United States amount to almost $500.00 per acre, nearly 70 percent of the total production cost for the crop. This is attributable to hand labor which is a great item of expense for the grower and which is sometimes undependable.

The general procedure for growing melons utilizing hand labor is as follows:

A cantaloupe crop is planted. After the plants begin to develop, the cantaloupe beds are cultivated to a somewhat rounded shape and the vines are hand trained over the curvature of the bed. The crop is cultivated in the usual manner, and as the first melons ripen near the crown of the plant they are hand picked. Subsequently, additional fruit completes development farther out along the vine over a period of two to three weeks, requiring successive multiple hand picking operations. The melons are hand selected on a basis of size, color and slip characteristics. A full slip melon is completely ripe and can be removed from the vine with almost zero force because of an abscission layer that develops between the fruit and the stem. Immature melons with incomplete development of the abscission layer remain more firmly attached to the vine. Because of this maturation process, 15 daily hand harvests in each field are common during the peak of the harvest.

Harvested fruit are transported to field trailers in bags carried by the pickers or by harvest aid conveyors used by some growers.

A mechanized system for cantaloupe production can substantially reduce peak labor requirements with concomitant reductions in costs. It is known to train cantaloupe vines across a flat bed in preparation for mechanical harvest. There is a presently existing machine capable of training vines across a flat bed and a machine capable of harvesting melons. The machines of Michael O'Brien, as disclosed in U.S. Pat. No. 3,277,605 and No. 3,331,197, exemplify the prior state of the art. Of particular interest is the machine described in U.S. Pat. No. 3,277,605 which employs successive rows of spaced flexible fingers to rake the melon beds in a vine training operation. The machine can be moved vertically. U.S. Pat. No. 3,331,197 discloses a machine for harvesting cantaloupe. These two machines are, used together, capable of mechanically training melon vines and harvesting melons.

It is desirable, however, to have a single inexpensive machine which can be combined with presently existing farm machinery already in the possession of most farmers to train the vines of melons and the like and to harvest melons which, like cantaloupe, are characterized by a spherical shape.

It is also desirable to have such a machine which can be adjusted in respect to pitch, roll and yaw in order to compensate for changes in forward speed and bed shape, and to have such a machine which can be so adjusted in order to vary the aggressiveness of the machines raking action. With these options the grower can more conveniently perform the operations involved.

Accordingly, it is an object of this invention to provide a combination vine training and melon harvesting machine.

Another object of this invention is to provide such a machine which is easily transportable and which can be used in conjunction with existing farm machinery.

It is yet another object of this invention to provide improvements in such a machine which will make it convenient to adjust attitudes of pitch, roll and yaw in such machine.

It is a further object of this invention to provide means for regulating the aggressiveness of the raking action of such a machine.

In yet another aspect, it is an object of this invention to provide such a machine which is inexpensive to build and operate.

Other, further, and more specific objects and advantages of this invention disclosed will become apparent to those skilled in the art from the following description of the invention taken in conjunction with the drawings in which.

Figure 1:
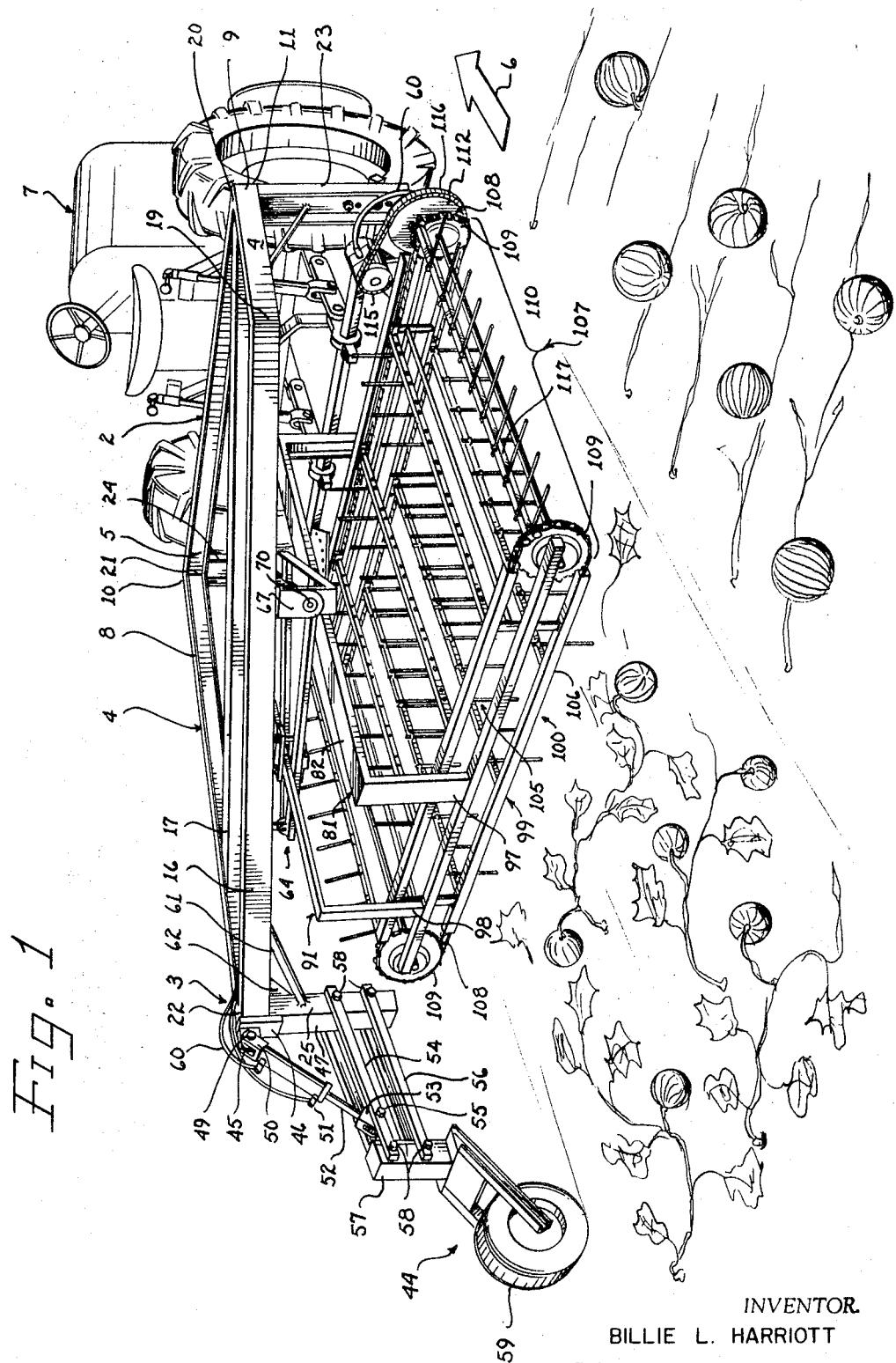
FIG. 1 is an elevation view of my invention showing the elements thereof in operative position in relationship to an existing tractor.

Briefly, I provide an apparatus for training vines and selectively harvesting melons and the like which comprises a frame having a front end, a rear end, two sides and a cross member. The apparatus also has means for attaching the front end to a tractor, means for raising and lowering the front end independently of the rear end, means for raising and lowering the rear end independently of the front end, and means for movably supporting the frame. I also provide a subframe which depends from the frame and which has a conveyor mounted on the subframe. This conveyor has an upper run and a lower run and spaced rows of spaced flexible fingers projecting from the lower run of the conveyor toward the ground. I also provide means for driving the conveyor at a speed relative to the speed of advance of the frame, and the angular attitude of the subframe relative to the line of advance of the frame, such that the fingers of the conveyor move on the latter's lower run at a predetermined angle to the line of advance of the frame. I also provide means for pivotally suspending the subframe from the frame. Said means are adapted to adjust the roll and yaw of the subframe relative to the line of advance of said apparatus. The means comprises a pivot around a horizontal axis longitudinally oriented with respect to the line of advance of the apparatus and a pivot around a vertical axis. I also provide stop means for positioning the subframe at a predetermined attitude of roll and yaw. In the presently preferred embodiment of my invention I use hydraulic jacks as means for independently adjusting the height of the front and rear ends of the frame. Also in the presently preferred embodiment I use, as a means for movably supporting the frame, a wheel attached to the rear end of the frame and means for attaching the front end of the frame to a tractor.

I have found that my improved invention is best adapted to use for training vines and harvesting melons in fields which have been prepared as follows:

Essentially flat raised beds, which may have a slight slope, are prepared in parallel rows with furrows spaced between them. Melon seeds are planted along one side of a bed in spaced relationship.

When the vines appear, a tractor advances down the furrows drawing the vine trainer and harvester over the bed behind it. As the apparatus advances, the lower run of the conveyor rakes its flexible fingers over the surface of the raised bed. The yaw of the subframe, the rate of advance of the frame and the speed of the conveyor combine to yield a line of raking action perpendicular to the length of the raised bed. The direction of raking is from the side of the raised bed on which the melon is planted, that is to say, the crown, toward the opposite side of the raised bed. The training action is repeated on several occasions until the vines with the growing melons are growing in the desired direction. Pitch and roll adjustments can be made to vary the aggressiveness of the raking action depending upon the results desired. The various adjustments may also take into account the slope of the bed being worked.

After the first melons ripen, my apparatus is used as a selective mechanical harvester. The flexible fingers comb through the vines in the same direction that the vines were previously trained. As the melons reach the full slip stage, they are detached from the vines and rolled out of the vine area into the adjacent furrow. Green melons remain attached to the vine for later harvest because abscission has not developed and the flexible fingers move over or around them. Hence, the machine has multiple harvest capabilities. During the peak of the season, harvesting is performed daily to obtain the rapidly ripening fruit and is not dependent upon the current availability of labor.

The means for raising and lowering the front and rear ends of the frame makes it possible to raise the entire device from the ground for ease of transport from field to storage area and also provides a convenient means for turning the machine around to make another pass down the next bed to be worked.

Figure 2:
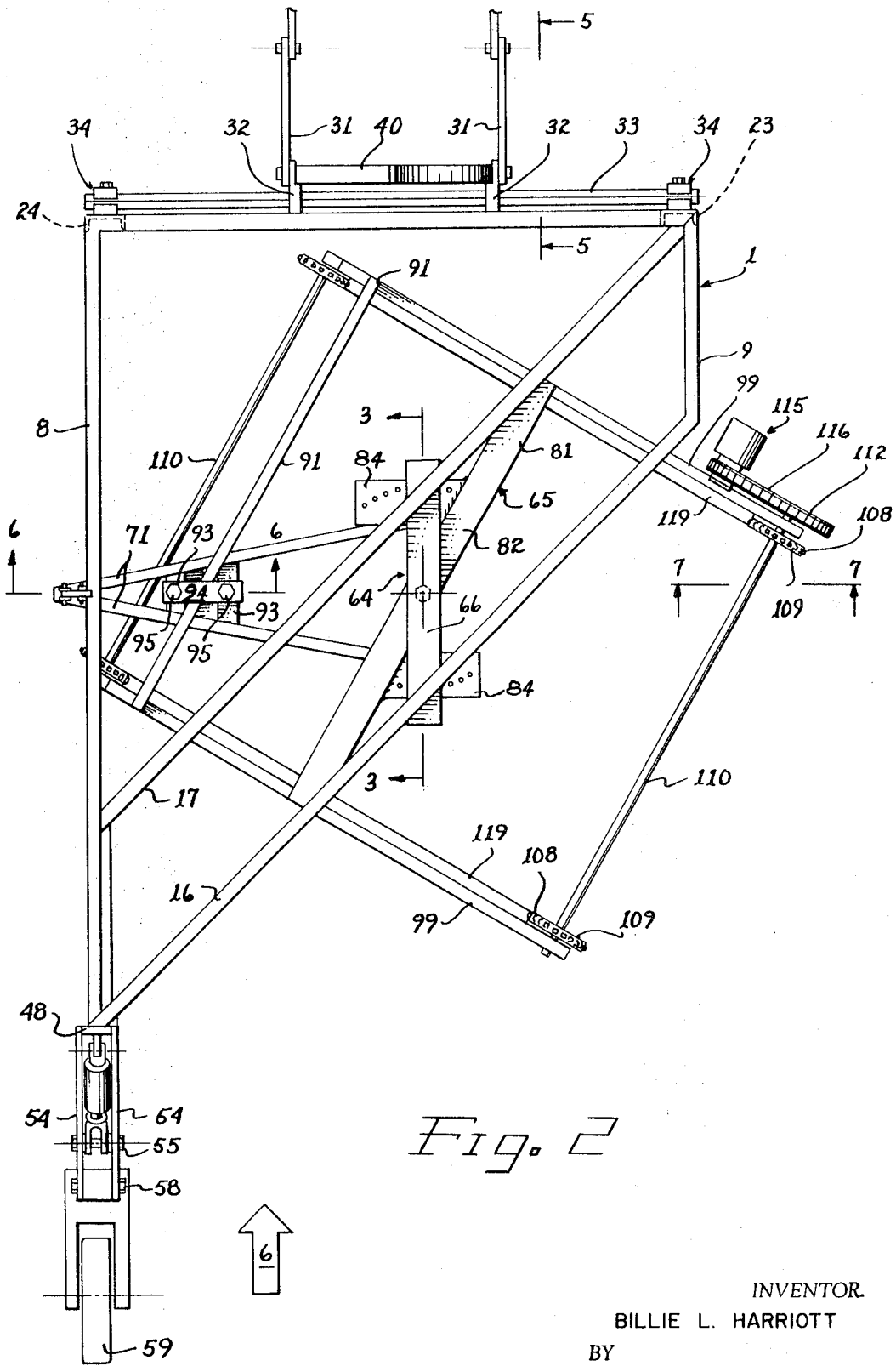
FIG. 2 is a plan view of my invention.
Figure 4:
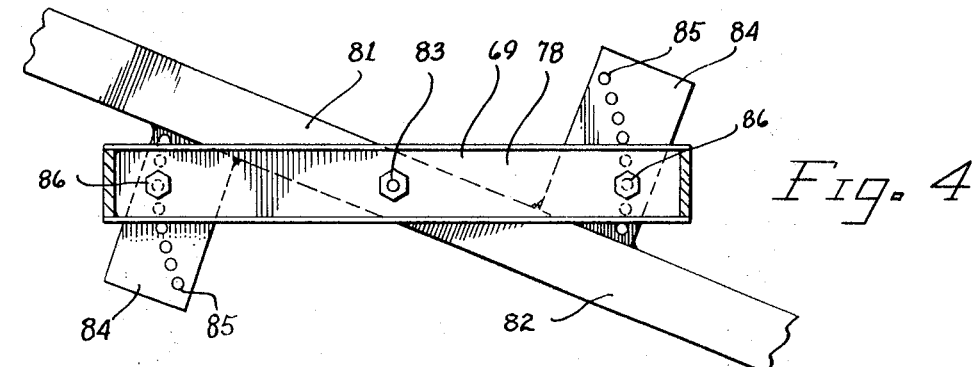
FIG. 4 is a view of the device of FIG. 3 along the line 4–4.
Figure 3:
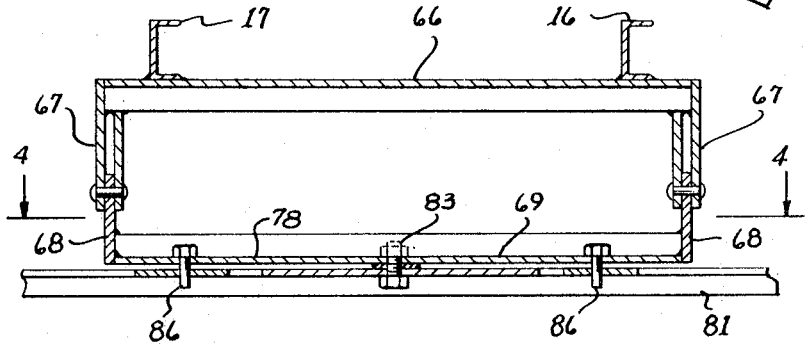
FIG. 3 is a sectional view of the device of FIG. 2 along the line 3–3.
Figure 5:
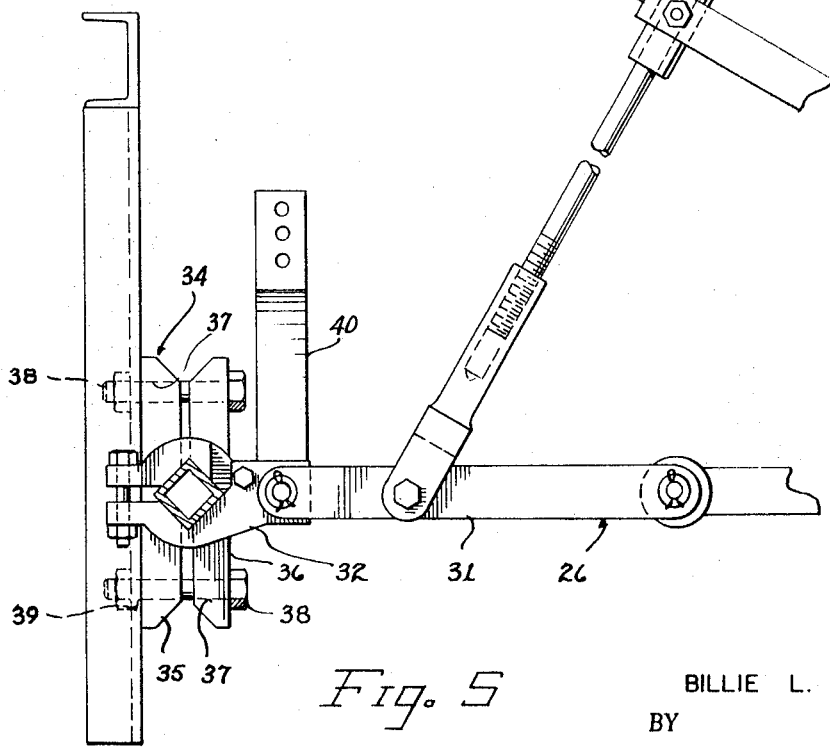
FIG. 5 is a view of the means for attaching the device of FIG. 2 to a three-point hitch linkage attachment on a standard tractor (not shown)
Figure 6:
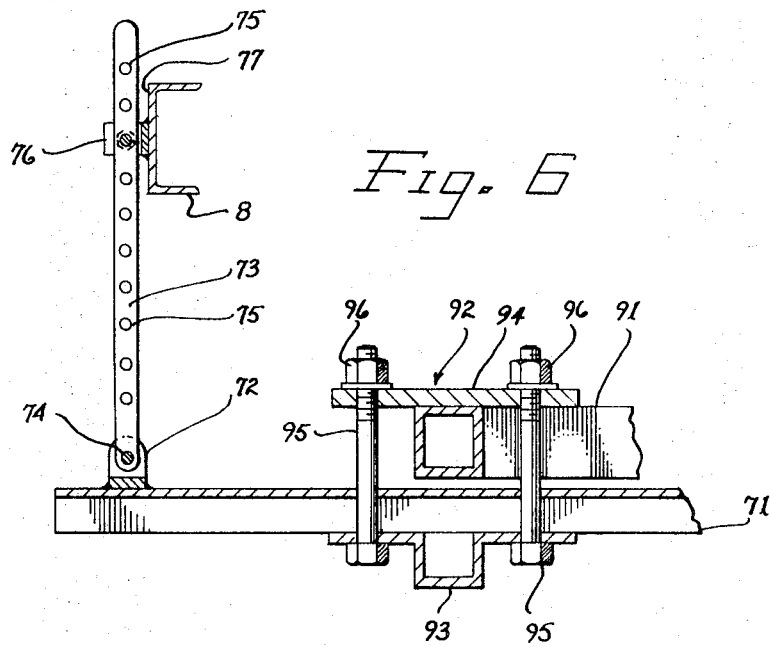
FIG. 6 is a view, partly in section, of the device of FIG. 2 along the line 6–6.
Figure 7:
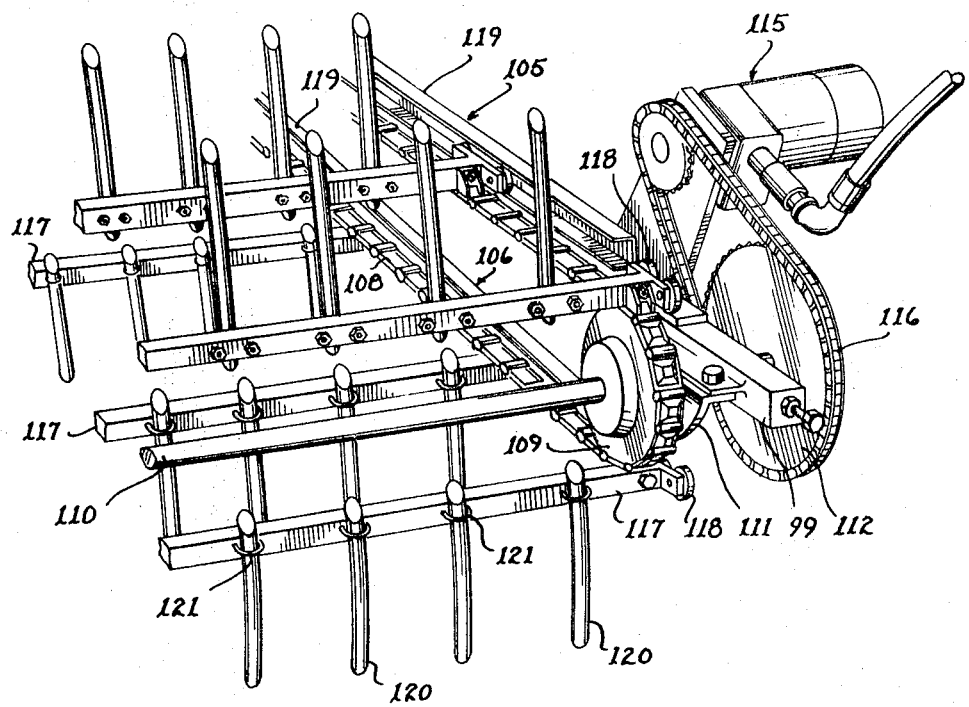
FIG. 7 is a view, partly in section, of the device of FIG. 2 along the line 7–7.

Turning now to the drawings in which a presently preferred embodiment of my invention is illustrated, the apparatus has a frame 1 which has a front end 2 and a rear end 3 and sides 4. The front end 2 of the frame 1 has a horizontal forward frame member 5. This horizontal forward frame member 5 is disposed at right angles to the normal line of advance 6 of the tractor 7 which draws the frame 1. The horizontal side members 8 and 9 are welded to the ends 10 and 11 of the horizontal forward frame member 5. They extend horizontally toward the rear end 3 of the frame 1 at a right angle to the horizontal forward frame member 5 and parallel to each other. The horizontal side member 9 is much shorter than the horizontal side member 8. Two cross members 16 and 17 extend respectively from the rear end 18 of side member 8 to the rear end 19 of side member 9. Cross member 17 extends from the juncture 20 of side member 9 and horizontal forward frame member 5 along a line parallel to frame member 16, and attaches to side member 8. The horizontal forward frame member 5, horizontal side members 8 and 9 and the cross members 16 and 17 all occupy the same plane. Extending downwardly from the junctures 20 and 21 of the horizontal forward frame member 5 with side members 9 and 8 respectively, and the juncture 22 of side member 8 and cross member 16, are vertical frame members 23, 24 and 25. All of the frame members are constructed of channel members to provide rigidity. I have found that the shape of the frame adopted in the embodiment illustrated in FIG. 1 and FIG. 2 provides a sufficiently strong structure and a certain savings in construction and material costs is effected by avoiding the necessity of employing a rectangular frame structure. The components of the frame are joined by welding.

In the embodiment illustrated, the frame 1 is attached to a three-point hitch linkage 26 on a standard tractor 7. The three-point hitch linkage 26 has opposed lower arm members 31 on which jaws 32 are provided for attachment to a draw bar 33. The draw bar 33 is attached to the vertical frame members 23 and 24 by means of opposed clamps 34. In cross section, the draw bar 33 is square. Each of the opposed clamps 34 has an inner standard 35 and an outer standard 36 which have apertures 37 near their ends for the reception of bolts 38. The bolts 38 extend through the apertures 37 in the inner and outer standards 35 and 36 and through apertures 39 in the vertical frame members 23 and 24. Suitable indentations are made in the standards 35 and 36 to accommodate the cross-sectional configuration of the draw bar 33. As nuts are tightened on the bolts 38, the inner and outer standards 35 and 36 are compressed and frictionally engage the draw bar 33. The jaws 32 of the lower arm members 31 of the three-point hitch linkage 26 are tightened around the draw bar 33, thus attaching the front end 2 of the frame 1 to the tractor 7. The spaced relationship of the lower arm members 31 is maintained by a rigid metal bar 40. The three-point hitch linkage 26 is standard tractor attachment and known to persons skilled in the art. The three-point hitch linkage 26 is hydraulically operated and provides a means for raising the front end 2 of the frame 1 independently of the rear end 3 of the frame 1. The operation of the three-point hitch linkage 26 is well understood and is therefore not shown or described in all its details.

The vertical frame member 25, attached to the rear end of the frame, provides an attachment for a support leg assembly 44. The support leg assembly 44 provides means for both raising and lowering the rear end 3 of the frame 1 independently of the front end 2 of the frame 1, and also for movably supporting the frame 1 in cooperation with the three-point hitch linkage 26. The support leg assembly 44 is pivotally attached to the vertical frame member 25. A tab 45 projects rearwardly from a plate 46 welded to a vertical face 47 of the vertical frame member 25 which is on the same plane as a face created at the juncture 22 of side member 8 and cross member 16. A pivot pin 49 is journaled in the tab 45 and flanges 50. The flanges 50 are attached to a hydraulic jack 51. At the end of the piston 52 of the hydraulic jack 51 are flanges 53 which are attached to opposed parallel arms 54. The flanges 53 are joined to the opposed parallel arms 54 by means of a pivot pin 55 journaled therein. To provide rigidity for the structure, matching opposed parallel arms 56 are provided. The ends of the opposed parallel arms 54 and the matching parallel arms 56 are pivotally attached to the vertical frame member 25 and a wheel support member 57 by means of pivot pins 58 journaled in the sidewalls. The vertical frame member 25 has a U-shaped cross section which provides sidewalls in which the pivot pins 58 may be journaled. A wheel 59 is attached to the wheel support member 57 in the usual way. Hydraulic pressure is supplied through flexible hoses 60. The vertical frame member 25 and cross member 16 have a corner tab 62 joining said frame member 25 and side member 8 for support.

The subframe 65 is attached to the frame 1 by means of an upper cross support 66 welded to the bottom of cross members 16 and 17. At both ends of the upper cross support 66 are downwardly extending flanges 67. The upwardly extending flanges 68 of the lower cross support 69 fit inside the downwardly extending flanges 67 of the upper cross support 66 and are pivotally attached by means of a pivot pin 70 journaled in said flanges 67 and 68. Extending from spaced points on said lower cross support 69 toward side member 8 of the frame 1 are stop member arms 71 which converge and join at a point on the outside of the frame 1 and to the side of the side member 8. An upwardly extending tab 72 is pivotally attached to vertical stop member 73 by means of a pivot pin 74 journaled in said tab 72. A plurality of apertures are disposed along the length of the vertical stop member 73. An outwardly projecting tab 76, attached to the side face 77 of horizontal side member 8, has an aperture of the same size and configuration as apertures 75. The vertical stop member 73 is fastened to the tab 76 by means of a bolt passed through the registered apertures of the tab and vertical stop member 73.

The subframe 65 is supported at two points by the pivotal support assembly 64. The first point of support is at the midpoint of the lower cross support 69 which latter has a horizontal face 78. The subframe 65 has a major horizontal support piece 81 which has a horizontal face 82. The midpoints of the major horizontal support piece 81 and lower cross support 69 are pivotally joined by means of a pivot pin 83 which also assists in supporting the subframe 65. Tabs 84 are disposed on opposite sides of the major horizontal support piece 81 equidistant from pivot pin 83. Perforations 85 are provided in tabs 84 and are spaced along arcs of a circle centered at the axis of the pivot pin 83. Apertures in the lower cross support 69 register with perforations 85 in the tabs 84. By inserting bolts 86 through the perforations 85 in the tabs 84 and lower cross support 69, a stop means to control the yaw of the subframe 65 is created. In addition, these bolts 86 can serve as supports for the subframe 65. The second point of support is provided by minor horizontal support piece 91 secured by means of a clamp 92 to stop member arms 71. The clamp 92 has a lower strap 93 engaging the bottom of stop member arms 71. An upper strap 94 engages the upper surface of minor horizontal support member 91. The straps 93 and 94 are connected by bolts 95 and nuts 96 which can be tightened to provide frictional engagement of the straps 93 and 94 with the support piece 91 and arms 71. The clamp 92 serves as both support for the subframe 65 and as stop means to assist in maintaining the desired yaw and stability of the subframe 65. Major support piece 81 and minor support piece 91 have downwardly extending legs (97 and 98 respectively) which attach to side rails 99 which support the conveyor 100. The conveyor 100 is of the type described in the patent of Michael O'Brien, U.S. Pat. No. 3,277,605, comprising an upper run 105 and a lower run 106 on an endless belt 107. The belt 107 is made of opposed sprocket chains 108 driven by two pairs of sprockets 109, each pair spaced apart on one of the axles 110. The two axles 110 are disposed at the ends of side rails 99 and journaled in flanges 111 attached to the side rails 99. One axle connects to a drive sprocket 112 connected to an hydraulic motor 115 by sprocket chain 116. Spacing bars 117 are attached to the chains 108. At the ends of the spacing bars 117 are roller bearings 118 adapted to travel in and be guided by channeled rails 119. This arrangement serves the purpose of adding rigidity to the belt so that the desired force may be exerted by the flexible fingers 120 which are spaced along the bars 117 and secured by U-bolts 121.

Having now fully described my invention and the presently preferred embodiment thereof:

I claim:

1. An apparatus for training vines and selectively harvesting melons, and the like, said apparatus comprising:
   a. a frame having a front end, a rear end, two sides, and a cross member;
   b. means for attaching said front end of said frame to a tractor;
   c. means for raising and lowering said front end independently of the rear end;
   d. means for raising and lowering said rear end independently of said front end;
   e. means for movably supporting said frame;
   f. a subframe depending from said frame, said subframe having a conveyor mounted on said subframe, said conveyor having:
      an upper run and a lower run;
      spaced rows of spaced flexible fingers projecting from said lower run of said conveyor toward the ground;
   g. means for driving said conveyor at a speed relative to the speed of advance of said frame, and the angular attitude of said subframe relative to the line of advance of said apparatus, such that said fingers move on said lower run at a predetermined angle to the line of advance of the frame;
   h. means for pivotally suspending said subframe from said frame, said means adapted to adjust the roll and yaw of said subframe relative to the line of advance of said apparatus, said means comprising:
      a pivot around a horizontal axis longitudinally oriented with respect to the line of advance of said apparatus; and
      a pivot around a vertical axis;
   i. stop means for positioning said subframe at a predetermined attitude of roll and yaw.

2. The apparatus of claim 1 wherein the means for independent adjustment of the height of said front and rear ends of said frame comprises hydraulic jacks.

3. The apparatus of claim 2 wherein said means for movably supporting said frame comprises:
   a. a wheel attached to the rear end of said frame; and
   b. means for attaching said front end of said frame to a tractor.